(12) United States Patent
Patzer et al.

(10) Patent No.: US 6,732,270 B1
(45) Date of Patent: May 4, 2004

(54) METHOD TO AUTHENTICATE A NETWORK ACCESS SERVER TO AN AUTHENTICATION SERVER

(75) Inventors: Robert A. Patzer, Lake Zurich, IL (US); Lidong Chen, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 806 days.

(21) Appl. No.: 09/695,554

(22) Filed: Oct. 23, 2000

(51) Int. Cl.[7] .............................................. G06F 17/00
(52) U.S. Cl. ........................ 713/170; 707/201; 707/200
(58) Field of Search ............................... 713/150–155, 713/160–164, 168–171, 182, 185, 200–202

(56) References Cited

U.S. PATENT DOCUMENTS

| | | | |
|---|---|---|---|
| 6,691,227 B1 * | 2/2004 | Neves et al. | 713/162 |
| 6,694,429 B1 * | 2/2004 | Kalmanek et al. | 713/153 |
| 6,701,439 B1 * | 3/2004 | Dunn | 713/201 |

OTHER PUBLICATIONS

Gong, Increasing availability and security of an authentication service, Selected Areas in Communications, IEEE Journal on, vol. 11, Issue 5, Jun. 1993, pp. 657–662.*

Almeida et al., An authentication server in Java implementation of an encryption framework model and DES algorithm in Java, Telecommunications Symposium, 1998, ITS '98 Proceedings, SBT/IEEE International, vol. 2, Aug. 9–13, 1998, pp. 627–631, vol. 2.*

Chen et al., Key distribution without individual trusted authentication servers, Computer Security Foundations Workshop, 1995, Proceedings, Eighth IEEE, Jun. 13–15, 1995, pp. 30–36.*

* cited by examiner

Primary Examiner—David Jung

(57) ABSTRACT

A method of authentication between servers in a three party network protocol network includes first providing at least one network access server (NAS) in communication with at least one user of the network and also in communication with at least one remote authentication server (RAS) coupled to the network. An access request message including a user password is sent from the user to the NAS. The NAS encrypts the password with a shared secret between the NAS and the RAS. The NAS subsequently tags a message authentication code (MAC) using the shared secret to the encrypted password. The encrypted password and MAC are then sent to the RAS. The RAS first authenticates the NAS by verifying the MAC before decrypting the encrypted user password.

14 Claims, 3 Drawing Sheets

METHOD TO AUTHENTICATE A NETWORK ACCESS SERVER TO AN AUTHENTICATION SERVER

FIELD OF THE INVENTION

The present invention relates generally to a communication network, and more particularly to a method of authentication between servers within the network.

BACKGROUND OF THE INVENTION

In a conventional three party network protocol, a user that is remote from a network accesses the network via a dial-up connection through a network access server. The network access server then communicates secured data to a security server or authentication server prior to the user gaining access to the network. The network access server acts as a client to the authentication server and passes identification information from the user to the security server with encryption or without encryption whenever the identification information is represented by a response to a random challenge. In a typical arrangement using such a protocol, the security server decrypts the encrypted user identification information or checks the user response and verifies the user. An access-accept or access challenge message is sent back to the user via the network access server if the identification information is recognized or authorized. An access-reject message is returned if the identification information is not recognized.

The conventional trust model of such a three party protocol system is to trust the network access server whereby the network access server does not authenticate itself to the authentication server. When the authentication server receives the access-request message from the network access server, it immediately decrypts or checks the password or other identification data of the user and verifies the user. No verification of the network access server is undertaken.

The network access server and the authentication server in such a three party network protocol typically share a secret value between them. When the network access server encrypts the identification information of the user, a network access server will encrypt it with the shared secret value and send the encrypted information to the authentication server. When the security server receives the information, the server automatically decrypts or otherwise checks the data using the shared secret, assuming an authorized network access server. However, in such a trust arrangement, a number of different situations can arise that cannot be distinguished by the network. An authentication server in such a three party protocol network cannot distinguish between the following several distinct instances that, instead, will appear essentially the same to the authentication server: (1) an authorized network access server correctly encrypts an invalid password from an illegal user and forwards it to the authentication server; (2) a cheating or imposter network access server incorrectly encrypts a valid password from a valid user, such as by using an invalid shared secret value, and forwards it to the authentication server: and (3) an imposter network access server incorrectly encrypts an invalid password from an illegal user, perhaps using an invalid shared secret value, and forwards it to the authentication server.

The authentication server will verify the encrypted information from the user against a list of authorized users and passwords. However, in such a network the authentication sever cannot distinguish between these three instances. In each instance the server will try to decrypt the data utilizing the shared secret value. In the first instance, the authentication server will correctly determine that the user is invalid because it will not recognize the decrypted password. In the second instance, the server will end up with junk after decrypting the information because it was not encrypted using the proper shared information. However, the server will still only determine that the user is an illegal user upon not recognizing the password. The server will not recognize the imposter network access server and will not recognize the valid user. Similarly, in the third instance the server will also receive only junk and will determine that only the user is illegal, not recognizing that the network access server is also an imposter. It is therefore a problem where a dishonest or imposter network access server attempts to access the security server.

There is therefore a need for a method of authenticating a network access server in such a three party network protocol to a security server before the security server exposes network access information to the imposter client server.

DETAILED DESCRIPTION OF THE PREFERRED EMBODIMENTS

The invention is directed generally to a method of authenticating or verifying a client server in a three party communication network protocol. In such a network, a remote user typically submits an access-request message to a network access server (NAS) or client of the network via a dial-up connection. The NAS will then encrypt the user request information including the password and utilize a shared secret value s when encrypting the password. The encrypted password and access-request is then sent via the NAS to a remote authentication sever (RAS) which immediately decrypts the password and verifies the user information. The invention is directed to a method of authenticating the NAS to the RAS prior to decrypting the user password. The method of the invention therefore permits the RAS to distinguish between a legal and an illegal user and also between an honest NAS and an imposter NAS, as well as being able to distinguish between incorrect information from the user and incorrect information from the NAS.

Figure 1:
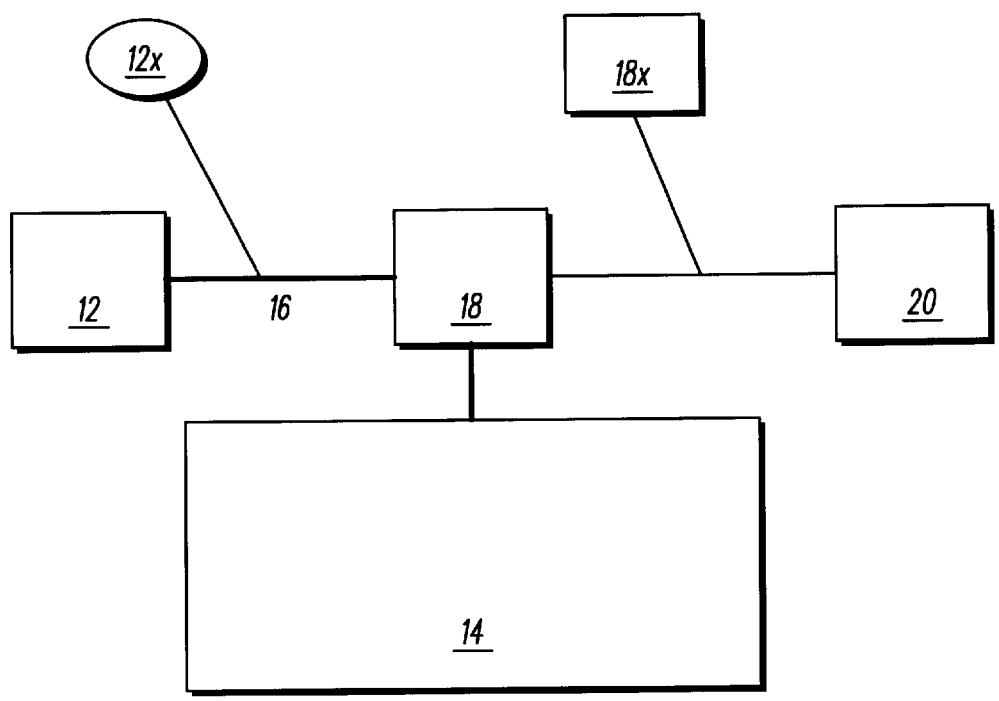
FIG. 1 is a block diagram representation of a portion of a communication network and various communication links for use in accordance with the teachings of the present invention.

Referring now to the drawings, FIG. 1 illustrates a block diagram representing a portion of a communication network and various communication links for use in accordance with the teachings of the present invention. FIG. 1 generally illustrates a network user 12, a network 14, a dial-up connection or communication link 16, a network access server (NAS) 18, and a remote authentication server (RAS)

20. The NAS 18 and the RAS 20 may or may not be a part of the network. Each can also be a part of one outside service or part of two different and discrete outside services that are capable of accessing or connecting to the network 14 as is known to those having ordinary skill in the art. The user 12 often wishes to access the network 14 from a remote location. The user 12 can typically do so by dialing in via the link or connection 16 to the NAS 18. A three party protocol is specified for the user 12, the NAS 18 and the RAS 20. The NAS 18 will send user authentication information to the RAS 20 to verify the user 12 as an authorized user of the network 14.

The NAS 18 receives an ACCESS-REQUEST message from the user and encrypts at least portions of the message, as necessary, and as described in greater detail below in one example. The NAS then delivers the ACCESS-REQUEST message including the encrypted portion to a remote authentication server 20 hereinafter identified as the RAS. The RAS decrypts the encrypted portion of the message and verifies whether the user is an authorized user of the network 14. In general, if the user is verified as authorized by the RAS, the RAS sends back an ACCESS-ACCEPT message and permits the user to access potions of the network 14 for which they have authorized access. In some systems, the RAS may verify the user information and yet send back an ACCESS-CHALLENGE message, requiring further proof of the user's identity or authorization. For the purposes of this description, we refer to the security information from the user as the user PASSWORD (P). The method of the invention will apply and the security information will be referred to herein as the password P, whether the user 12 is trying to initially access the network 14 or is responding to an ACCESS-CHALLENGE returned from the RAS.

The usage of the RAS frees the NAS from having to store the remote user security data. The centralized user security database makes the network less vulnerable to attack by an unauthorized user trying to break into the user sensitive database. Such three party network protocols are known to those having ordinary skill in the art.

In order to simplify the explanation of the invention, only one user 12, one NAS 18 and one RAS 20 are described herein and illustrated in FIG. 1. However, it is well known that a large number of the authorized users 12 may access the network 14. It is also known that multiple client servers such as the NAS 18 may be available to provide access to the network 14. It is further known to provide more than one RAS 20 having access to the network 14 for larger networks. Often, a number of different authentication servers 20 are included in the network 14 wherein each RAS performs a different verification function for a separate part of the network or for a specified group of authorized users. Sometimes these networks permit a user 12 to identify which RAS should be utilized depending upon the type of access required or type of data access requested.

Figure 2:
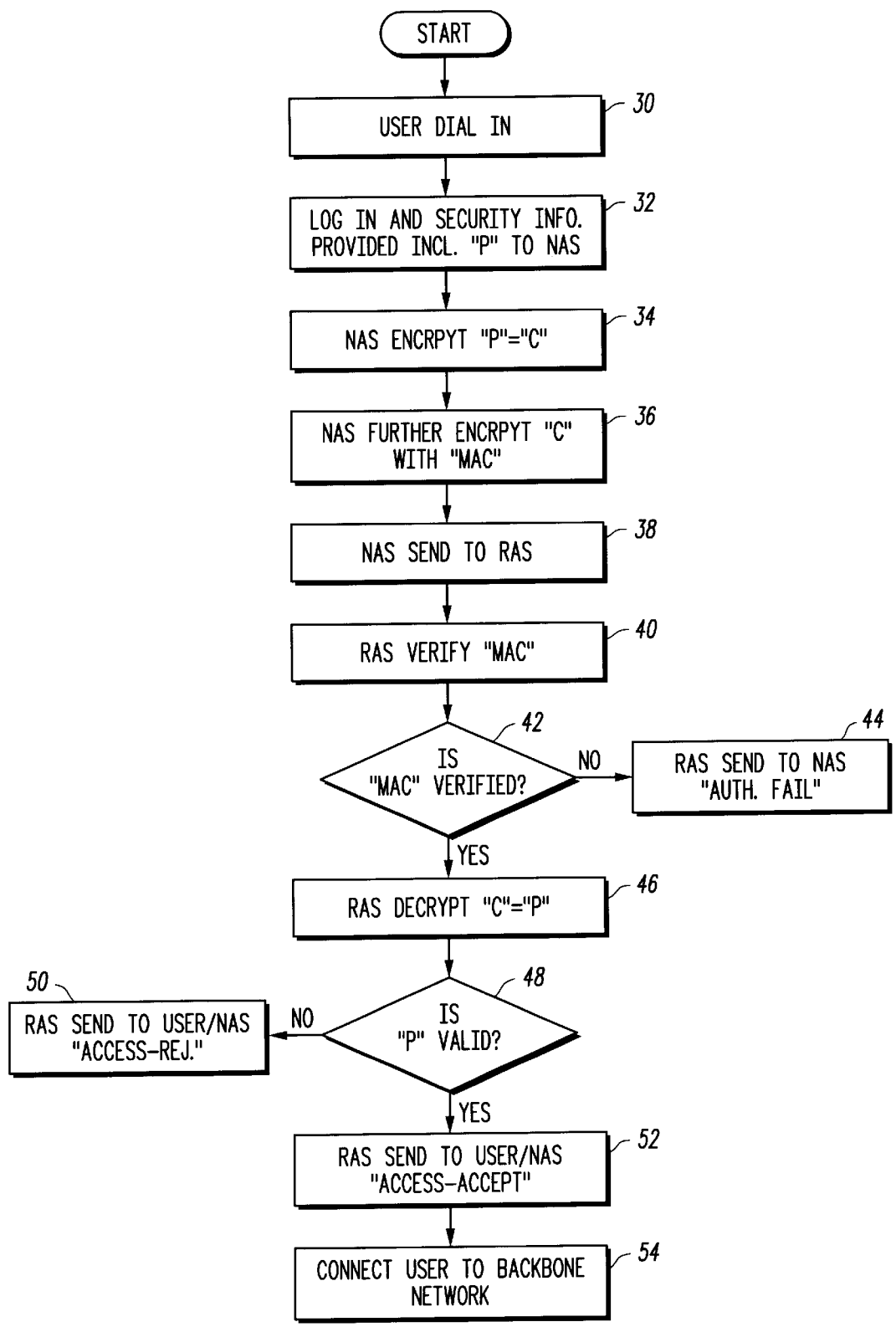
FIG. 2 is a flow diagram of a process for authenticating a network access server to a remote authentication server of the communication network shown in FIG. 1.

FIG. 2 illustrates a flow diagram of one example of a process or method for authenticating the NAS 18 to the RAS 20 of the communication network shown in FIG. 1. The user 12 first dials into the network via the NAS as shown at block 30. The user submits or provides access information including at least the user's password P at block 32. At block 34, the NAS encrypts P with a shared secret value, hereinafter identified as the shared secret value s. The shared secret value s is known between the NAS 18 and the RAS 20.

The shared secret s, in one example, is a binary string used as an encryption key as is known to those of ordinary skill in the art of security and cryptography. The shared secret can also be virtually any suitable key that is shared between the RAS and the NAS to secure information shared between them.

To illustrate the encryption at block 34 by way of example, assume that the user password $P=(p1, p2, \ldots, pi)$. In one example, each character p is a 128-bit number. The encryption of P then results in an encrypted user password identified by the equation:

$$E(P)=C=(c(1)\ c(2) \ldots c(i)), \tag{1}$$

where:

$$b1=MD5(s\ RA) \text{ and } c(1)=b1\ p1 \tag{2}$$

$$b2=MD5(s\ c(1)) \text{ and } c(2)=b2\ p2 \tag{3}$$

$$bi=MD5(s\ c(i-1)) \text{ and } c(i)=bi\ pi. \tag{4}$$

In the above equations, the shared secret value s is the key shared between the NAS and RAS. The term RA represents an initiate vector, which can be a random number that is generated by the NAS to encrypt the password. The above equations represent an encryption algorithm in the form of a stream cipher encryption wherein the key stream is generated by MD5 with the shared secret value s as a seed. MD5 represents a cryptography hash function and is an Internet Engineering Task Force (IETF) standardized hash function used in many different applications. As will be evident to those of ordinary skill in the art, the hash function MD5 used in this example can be replaced and can vary considerably within the scope of the present invention.

The encrypted password E(P) or, hereinafter, ciphertext C in current or existing three party protocol would then be sent to the RAS 20. The RAS would immediately decrypt this ciphertext using the same function and the shared secret value s to determine whether the password was a recognized password for an authorized user 12. However, if the NAS was an imposter NAS 18x, it would not know the correct secret shared value s. Therefore, the imposter NAS 18x would send a password that is improperly encrypted. In decrypting the ciphertext C, the RAS 20 would have no way of determining whether the information sent included an improper password from an illegal user 12x or a proper password from a legal user 12 that was sent by an imposter or illegal NAS 18x using an incorrect secret value.

Referring again to FIG. 2, the invention is more clearly understood. At block 36, the NAS 18 next adds a message authentication code (MAC) to the ciphertext C. The validity or authorization of the NAS 18 can be detected by the RAS 20, as described below, by this separate step.

According to the teachings of the present invention, a MAC is attached to the encrypted user password ciphertext C. The MAC will first identify the NAS 18 or 18x to the RAS 20 before the RAS undertakes decryption of the ciphertext C. In one example, instead of sending only the encrypted ciphertext C of the user password P to the RAS, the NAS attaches the MAC as follows:

$$c(1)\ c(2) \ldots c(i)\ c(i+1), \tag{5}$$

where c(i+1) is the MAC for the ciphertext C or encrypted user password. In one example according to the teachings of the present invention, c(i+1) is derived from the following:

$$c(i+1)=MD5(s\ c(1)\ c(2) \ldots c(i)), \text{ or,} \tag{6}$$

in another example, c(i+1) is derived from the following:

$$c(i+1)=MD5(s\ c(1)\ c(2) \ldots c(i)\ SQN), \tag{7}$$

where SQN represents an optional count number or sequencing number that is also attached to the MAC for "anti-replay attack" purposes as described in greater detail below.

In the above equations, it is evident that the shared secret value s that is known between the NAS 18 and the RAS 20 is utilized to generate the MAC that is attached to the encrypted user password or cipher text C. Further, MD5 again represents the hash function used to generate the key stream utilizing the shared secret value s as the seed. The SQN count number or sequence number can be added to information sent from the NAS to the RAS to uniquely identify each and every transmission. A "replay" attack is an attack by an imposter or unauthorized entity that can replay messages sent from an authorized party in order to impersonate the authorized party and access the network. As an example, an imposter NAS may intercept a MAC attached to an encrypted P from an authorized NAS and submit it to the RAS to gain verification from the RAS and access the network using the same password P. Adding a sequence or count number will indicate to the RAS whether the message being sent is a "fresh" message. The imposter, if using a "replay" tactic, would be submitting the MAC with the old SQN attached. This false submission would be easily recognized by the RAS.

As shown at block 38, the NAS 18 then sends the MAC to the RAS 20, and as shown at block 40, the RAS first verifies the MAC by using the shared secret value s and, optionally, the sequence number SQN. After verifying the MAC received from the client NAS, the RAS 20 has several options depending on the result of verifying the MAC information as shown at block 42. If the RAS 20 determines that the c(i+1) is not a correct MAC of the encrypted password or ciphertext C, then the RAS will not further decrypt the user password P. This indicates to the RAS that the client NAS is an imposter client server, such as NAS 18x. An imposter NAS will not be able to guess the shared secret value s and therefore will generate an incorrect MAC because it cannot attach a correct message authentication code or MAC to the ciphertext C. In such a case, the RAS 20 will send a message back to the NAS indicating that the NAS authentication has failed and that access to the network has been denied. This is indicated as block 44.

If, however, the RAS 20 verifies the MAC at block 44 and receives a correct c(i+1) as in the above example, the RAS will recognize the valid NAS 18. Upon arriving at the correct MAC, the RAS 20 will then decrypt the user password P as shown at block 46 utilizing the shared secret value s and decrypting the ciphertext C. At block 48, the RAS 20 compares the decrypted P to a list of data stored at the RAS to verify the user that is requesting access.

As indicated at block 50, the password P may be an incorrect user password indicating that the user is invalid or unauthorized, such as the illegal user 12x. In such a case, the RAS will send an ACCESS-REJECT message back to the NAS 18 that the user is unauthorized and that access to the network 14 has been denied for that reason. The NAS 18 will then notify the user 12x that access has been denied.

As indicated at block 52, the RAS 20 may alternatively find that P is valid and that the user 12 is an authorized user of the network 14. In such a case, the RAS will notify the NAS 18 by sending an ACCESS-ACCEPT message and the NAS will notify the user 12 of acceptance. Under these circumstances, the user 12 will then have access to the network 14, as shown at block 54, including all the access privileges granted to the particular user as identified by the password.

Figure 3:
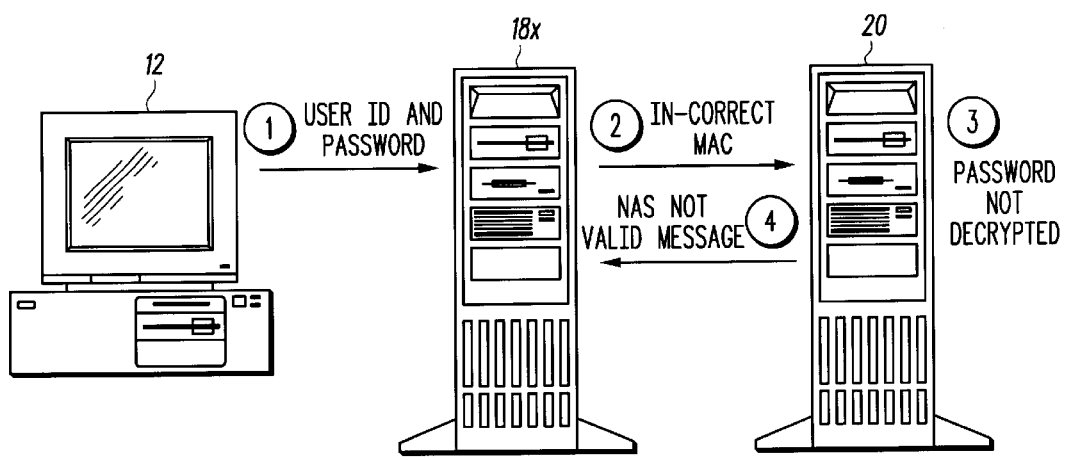
FIG. 3 is a schematic representation of the communication network shown in FIG. 1 where the network access server has been rejected by the remote server as unauthorized server.
Figure 4:
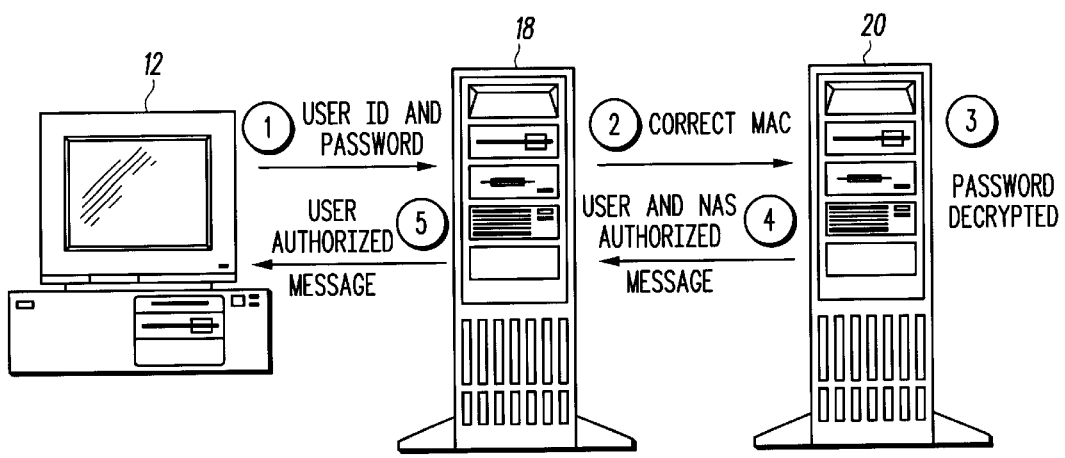
FIG. 4 is a schematic representation of the communication network shown in FIG. 1 where the network access server has been accepted by the remote server as an authorized server.

FIG. 3 illustrates generally the communication protocol for a three party protocol according to the invention wherein the imposter NAS 18x is detected by the RAS 20 as described above. Similarly, FIG. 4 shows a three party protocol according to the present invention wherein the RAS 20 has detected the valid or authorized NAS 18. Use of the invention permits an RAS to distinguish between a valid NAS 18, an invalid NAS 18x, a valid user 12, and an invalid user 12x.

The method of the invention is particularly beneficial in that an NAS or client server can be authorized to the RAS or authentication server of a network within the particular protocol of the network. By utilizing the method of the invention, the computing of MD5 will increase only from i times to (i+1) times when the password P is less than 128x i bits. Therefore, the added cipher for the RAS for separately identifying the NAS will be increased by only 128 bits under such circumstances. In addition, utilizing the method of the invention does not require changing any of the original message protocol format for the particular network.

As will be evident to those of ordinary skill in the art, the particular protocol of the network can vary and yet fall within the scope of the present invention. The method of the present invention is suitable for any network that utilizes a three party protocol including a user, a network access server and a remote authentication server. Also, the particular encryption and decryption algorithms utilized for any particular password formulation, shared secret values between servers, the algorithms to compute the MAC, and the like can also very considerably. In one example, a computer network protocol known as a Remote Authentication Dial In User Service (RADIUS) protocol utilizes the three party protocol. The user dials in to a client server or NAS which in turn communicates with a RADIUS server that acts as the RAS described herein. Other such network arrangements are also certainly well suited for the server to server authentication method of the invention.

The foregoing detailed description has been given for clearness of understanding only, and no necessary limitations should be understood therefrom, as modifications would be obvious to those of ordinary skill in the art.

What is claimed is:

1. A method of authentication between servers in a three party network authentication protocol, the method comprising the steps of:
   providing at least one network access server (NAS) in communication with at least one user of the network and in communication with at least one remote authentication server (RAS) coupled to the network;
   sending an access request message including a user password from the at least one user to the NAS;
   creating an encrypted password at the NAS with a shared secret between the NAS and the RAS;
   attaching a message authentication code at the NAS to the encrypted password;
   sending the encrypted password and message authentication code to the RAS; and
   authenticating the NAS by verifying the message authentication code at the RAS before decrypting the encrypted user password.

2. A method according to claim 1, wherein the step of attaching the message authentication code further comprises:
   creating the message authentication code from the encrypted password and the shared secret.

3. A method according to claim 1, further comprising the step of:
   using a unique sequence number as part of an input to compute the message authentication code.

4. A method according to claim 1, wherein the step of sending further comprises:

attaching the message authentication code to a network access-request message sent from the NAS to the RAS.

5. A method according to claim 1, wherein the password P includes characters P=(p1, p2, . . . pi), and wherein the step of attaching the message authentication code further comprises generating a message authentication code c(i+1) of the encrypted password E(P) where E(P)=(c(1) c(2) . . . c(i)), and i is the number of characters in the password.

6. A method according to claim 1, wherein the three party network authentication protocol is a remote authentication dial-in user service (RADIUS) network protocol.

7. A method according to claim 6, wherein the network access server is a client server and authentication server is a RADIUS server.

8. A method according to claim 1, wherein the three party network authentication protocol is a remote authentication dial-in user service (RADIUS) network protocol.

9. A method according to claim 8, wherein the network access server is a client server and authentication server is a RADIUS server.

10. A method of authentication in a three party communication network protocol, the method comprising the steps of:

assigning a user password to identify a particular user of the network;

delivering an access-request message from the user to a network access server (NAS) of the network including the user password;

creating an encrypted user password at the NAS utilizing a shared secret that is shared between the NAS and a remote authentication server (RAS) of the network;

generating a separate message authentication code at the NAS utilizing the shared secret;

attaching the message authentication code to the encrypted password;

sending the access-request message including the encrypted password and the message authentication code to the RAS; and authenticating the NAS by verifying the message authentication code at the RAS before decrypting the encrypted password.

11. A method according to claim 10, wherein the step of generating includes generating the message authentication code from the encrypted password utilizing the shared secret.

12. A method according to claim 10, further comprising the step of:

using a unique sequence number as part of an input to compute the message authentication code.

13. A method according to claim 10, wherein the step of sending further comprises:

attaching the message authentication code and encrypted password to the network access-request message sent from the NAS to the RAS.

14. A method according to claim 10, wherein the password P includes characters P=(p1, p2, . . . pi), and wherein the step of attaching the message authentication code further comprises generating a message authentication code c(i+1) of the encrypted password E(P) where E(P)=(c(1) c(2) . . . c(i)), and i is the number of characters in the password.

* * * * *